(No Model.)
J. W. CHENEY.
REGULATING SPEED OF DRIVEN SHAFTS.
No. 294,760. Patented Mar. 11, 1884.
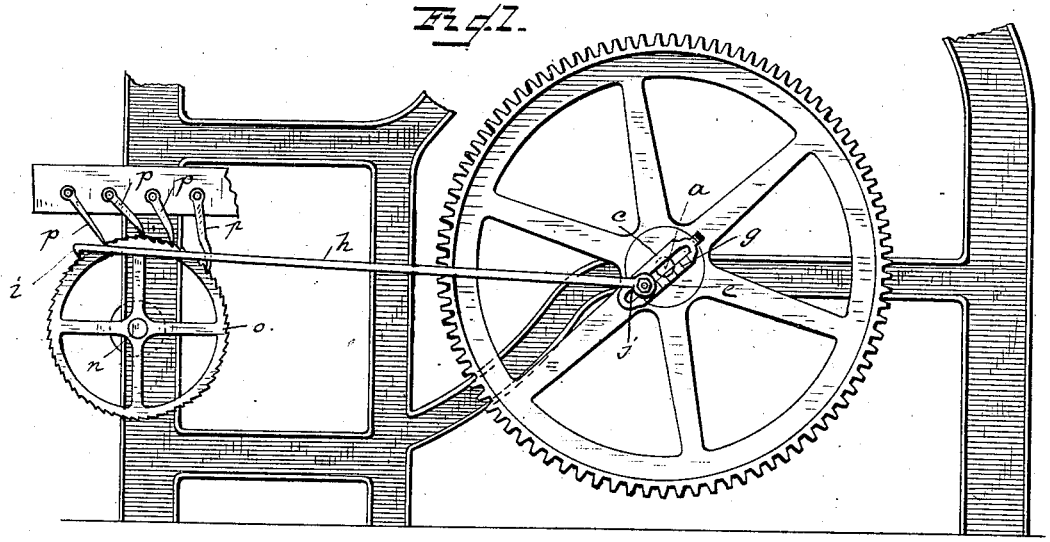
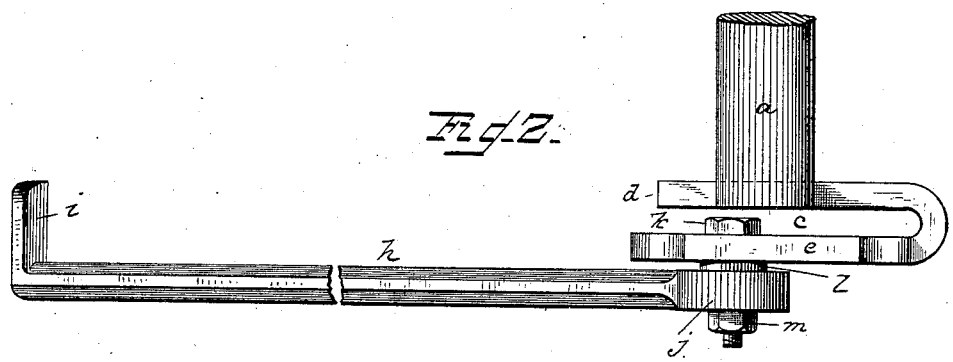
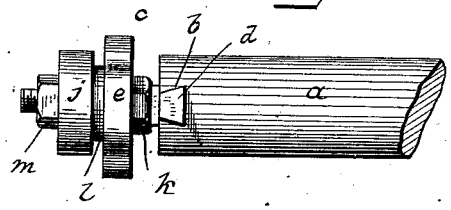
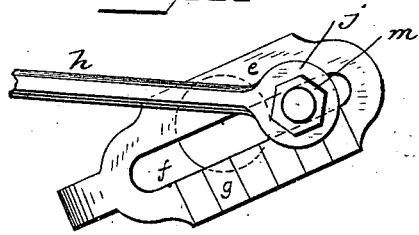
WITNESSES
Franck L. Durand
Edwin A. Finckel
INVENTOR
Joseph W. Cheney
by Charles E. Buell
Attorney

UNITED STATES PATENT OFFICE.

JOSEPH W. CHENEY, OF PALMER, MASSACHUSETTS, ASSIGNOR OF ONE-HALF TO ROSCIUS C. NEWELL, OF SAME PLACE.

REGULATING SPEED OF DRIVEN SHAFTS.

SPECIFICATION forming part of Letters Patent No. 294,760, dated March 11, 1884.

Application filed September 12, 1883. (No model.)

*To all whom it may concern:*

Be it known that I, JOSEPH W. CHENEY, a citizen of the United States, residing at Palmer, in the county of Hampden and State of Massachusetts, have invented a certain new and useful Improvement in Regulating Speed of Driven Shafts, of which the following is a specification, reference being had therein to the accompanying drawings.

This invention is in the nature of means for regulating the speed of a shaft to which an intermittent or step-by-step-rotation is imparted from a main driving-shaft or other source of power.

The invention consists in providing a driving-shaft with an adjustable or fixed elbow having a slotted arm, in which slotted arm is adjustably arranged a rod, the other end of which rod is provided with a tooth or pick constituting a pawl adapted to engage a ratchet on the shaft to be driven, said ratchet being held in any position in its circle of rotation by one or more of a plurality of dogs, whereby the speed of such driven shaft may be very quickly regulated or varied without the use of change-gears or other complex attachments.

In the accompanying drawings, in the several figures of which like parts are similarly designated, Figure 1 is a side elevation of my invention applied, a part of the framing of the machine being shown. Fig. 2 is a top plan view, on a larger scale, of the pawl and the adjusting-elbow. Fig. 3 is an end view, in elevation, of Fig. 2; and Fig. 4 is a front elevation of the elbow.

The letter $a$ designates a shaft, which may be the main shaft of a machine, and in the end of this shaft is made a dovetail socket or recess, $b$, in which is arranged, fixedly or adjustably, an elbow, $c$, at right angles to the longitudinal axis of the shaft and rotating with it. This elbow has one arm, $d$, dovetailed to match the dovetail in the shaft, and has its other arm, $e$, flattened and provided with a slot, $f$, longitudinally thereof, one edge of which slot may be provided with graduations or a scale, $g$, to indicate points of adjustment on said arm.

$h$ is a rod provided with a pick or tooth, $i$, at one end, standing off laterally from it, and provided at its other end with a boss, $j$. This boss is perforated to admit a bolt, $k$, passed through it from the rear of the slotted arm $e$ of the elbow $c$, said bolt extending first through the slot in said arm, and having a washer, $l$, interposed between the arm $e$ and the boss $j$, and secured by a nut, $m$, outside the boss, the parts $k$ $l$ $m$ serving as a clamp to hold the rod $h$ in any position to which it may be adjusted in the slotted arm $e$, to vary the length of throw of said rod by the lengthening or shortening of its radius with respect of its center of motion—viz., the shaft $a$. The driven shaft $n$—for instance, the take-up roll of a loom—is provided with a ratchet-wheel, $o$, and the teeth of this ratchet are engaged, one, or every second, third, or fourth one, or otherwise, as desired, by the pick or tooth $i$ of the rod $h$ as said rod is reciprocated by the rotation of the shaft $a$, and said shaft $n$ is accordingly rotated by an intermittent or step-by-step motion, the length of each step being varied at will by the adjustment of the pawl $h$ $i$ in its elbow, and hence the rapidity of rotation of the shaft governed.

The holding of the ratchet at the point to which it may be brought by the pawl is assuredly effected by one or more of a number of dogs, $p$ $p$, engaging the teeth of said ratchet.

From the foregoing it will be seen that by varying the location of the pin or bolt $k$ in the slot $f$ with respect to the shaft, the pawl has a greater or less radius, and hence throw, and the driven shaft consequently is moved at each stroke of the pawl a larger or fewer number of teeth, and consequently its speed or rate of rotation correspondingly increased or diminished. This result has heretofore been accomplished in looms, for instance, by change-gears; but these are too expensive and occupy too much mill-room, and my invention is a simple, cheap, but thoroughly reliable and efficient substitute for such.

What I claim is—

The combination, substantially as shown and described, of a main rotary shaft and a driven shaft with an elbow secured to the driving-shaft, a pawl adjustable therein to vary its throw, a ratchet on the driven shaft, engaged by the pawl to impart an intermittent or step-by-step motion to said driven shaft, and means to hold said driven shaft at the points to which it is pulled by the pawl, as set forth.

In testimony whereof I affix my signature in presence of two witnesses.

JOSEPH W. CHENEY.

Witnesses:
CHARLES E. BUELL,
GEO. C. BUELL.